J. S. HITTELL & G. W. DEITZLER.
APPARATUS FOR COLLECTING, STORING AND UTILIZING HEAT.
No. 188,517. Patented March 20, 1877.

UNITED STATES PATENT OFFICE.

JOHN S. HITTELL AND GEORGE W. DEITZLER, OF SAN FRANCISCO, CAL.

IMPROVEMENT IN APPARATUS FOR COLLECTING, STORING, AND UTILIZING HEAT.

Specification forming part of Letters Patent No. 188,517, dated March 20, 1877; application filed October 7, 1876.

*To all whom it may concern:*

Be it known that we, JOHN S. HITTELL and GEORGE W. DEITZLER, of the city and county of San Francisco, California, have invented a new and Important Apparatus for Collecting, Storing, and Utilizing Heat, of which the following is a specification:

This apparatus is devised to collect solar or other heat, store it up in a heat-reservoir—a mass of iron or other suitable material—confine it in the reservoir until needed, keep it in such form that it can be transported from place to place, and utilize it for industrial or other purposes.

The solar-heat-collecting device may be a mirror or mirrors, concave or plain, or a lens or lenses, so arranged as to intensify in a complete or partial focus the light and heat, and all the forces conveyed in the solar rays.

The contrivance for keeping the heat stored up in the reservoir until needed consists of a heat-box with non-conducting walls for receiving and inclosing the reservoir.

The apparatus for utilizing the heat consists of a heat-reservoir chamber with non-conducting walls to inclose the hot reservoir, and doors or valves to let the cold air pass in, and to let the heated air pass out through a pipe or flue to the place where it is to be used.

For special purposes a devaporizing-chamber and a drying-chamber may be connected with the heat-reservoir chamber, all as hereinafter described.

Figure 1:
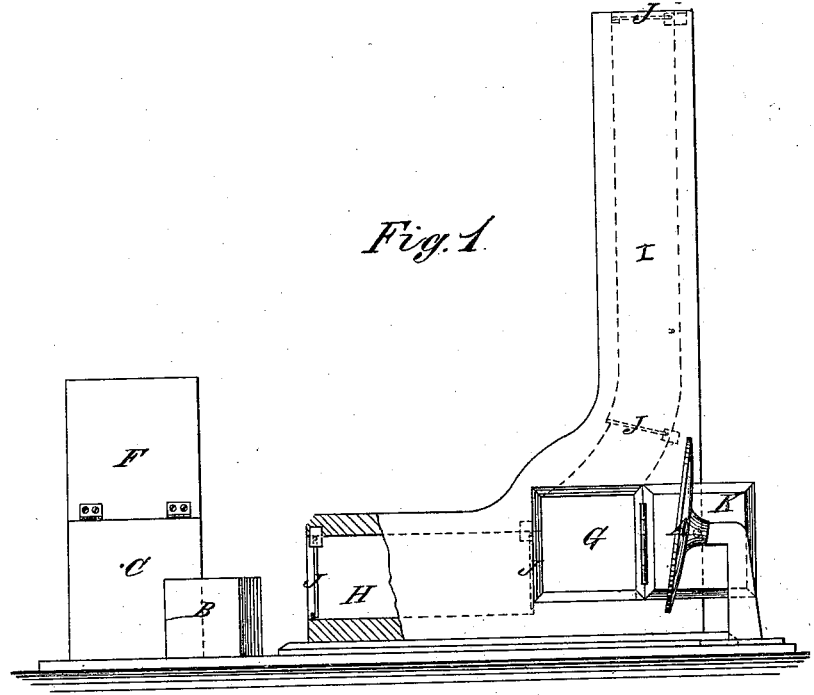
Figure 2:
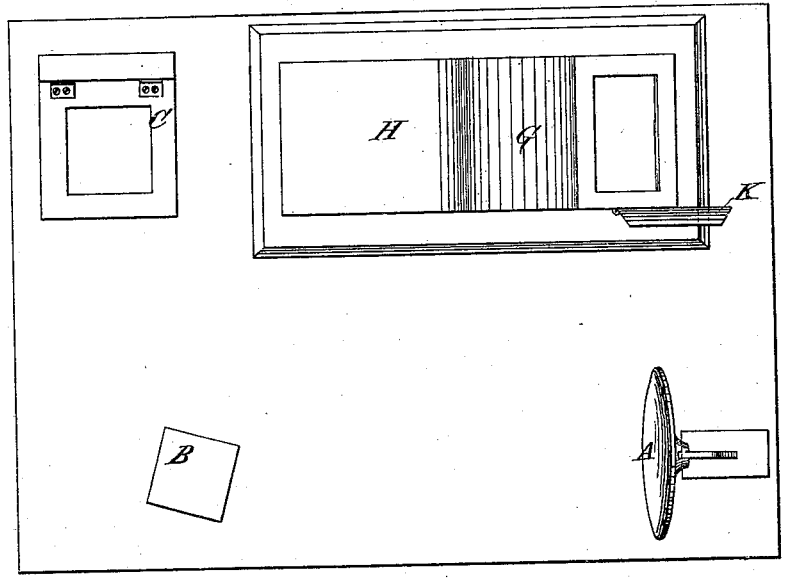

Figure 1 is partly a side elevation and partly a section of our improved apparatus. Fig. 2 is a plan view.

Similar letters of reference indicate corresponding parts.

A is a concave mirror for concentrating the solar rays upon the heat-reservoir B, which is a mass of iron or other suitable material. C is the heat-box for confining the heat until needed, and also for serving as package for transporting the heat-reservoir when hot. The heat-box may have different forms, some movable and others fixed—the latter for keeping the heat without transporting it—and these last may be either under or above ground.

The movable heat-box may also be used in keeping the reservoir when the heat is being utilized for some purposes.

G is the heat-reservoir chamber, in which the heat is communicated from the hot reservoir to the air. Under certain circumstances the heat-reservoir may be heated in the heat-reservoir chamber. H is a devaporizing-chamber, for extracting the moisture from the air by means of a deliquescent substance or other material or treatment. A vertical stack or flue, I, communicates with the heat-reservoir chamber, for conveying the heated air away for use.

The device for concentrating the solar rays may be either stationary or movable, and, if movable, may be moved by hand or automatically to follow the sun.

The various chambers mentioned will have valves J at the ends to regulate the passage of the air, and there will be a door or doors, K, at the side or bottom.

The air passing to the heat-reservoir chamber may be required to pass through the devaporizing-chamber, so as to deprive it of its moisture, and thus increase its capacity to absorb other moisture.

Having thus described our invention, we claim as new and desire to secure by Letters Patent—

1. The combination of a solar-ray concentrating apparatus with a heat-reservoir, a heat-reservoir chamber, a heat-box, a drying-chamber, and a devaporizing-chamber, substantially as specified.

2. The combination of solar-heat concentrator A and a heat-reservoir, B, substantially as specified.

3. The combination of a heat-chamber, G, heat-reservoir B, and a drying-chamber, H, substantially as specified.

JOHN S. HITTELL.
GEO. W. DEITZLER.

Witnesses as to Deitzler:
C. W. CRANE,
F. O. WEGENER.

Witnesses as to J. S. Hittell's signature:
FRANK SOULÉ,
R. LIVINGSTONE.